Feb. 3, 1931.                J. J. CAIN                1,791,120
              WATER LEVEL INDICATOR FOR BOILERS
                      Filed June 28, 1929
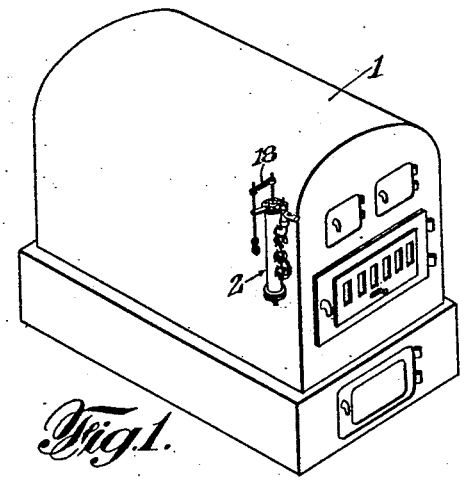
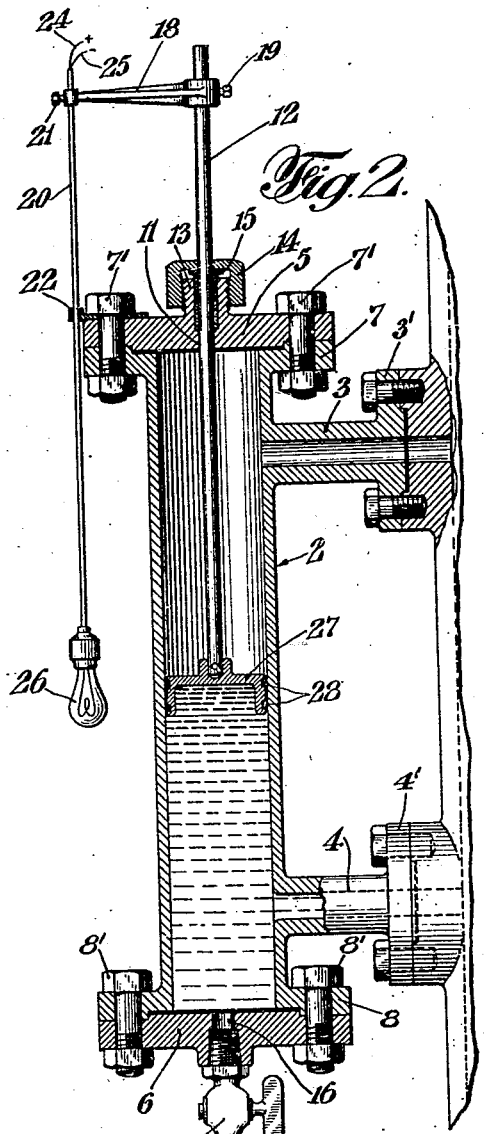
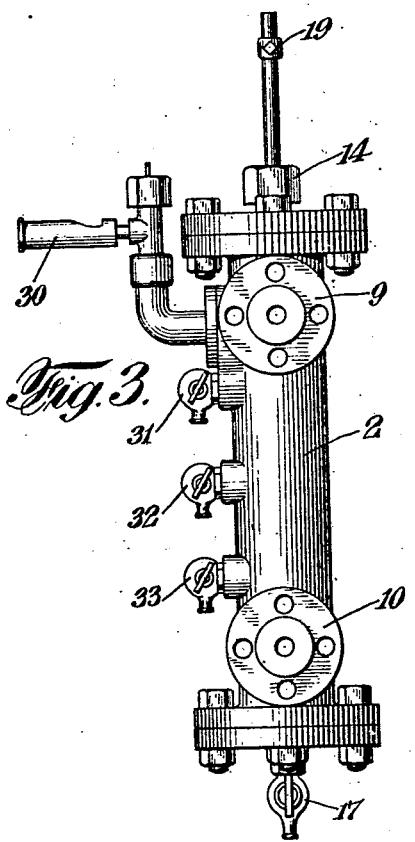
INVENTOR
John J. Cain
BY
Pringle, Wright, Bean & Mann
ATTORNEYS Patented Feb. 3, 1931

1,791,120

UNITED STATES PATENT OFFICE

JOHN J. CAIN, OF BAYONNE, NEW JERSEY

WATER-LEVEL-INDICATOR FOR BOILERS

Application filed June 28, 1929. Serial No. 374,342.

This invention relates to a liquid level indicator or gage for boilers, and has for its principal objects the provision of an indicator or gage which is cheap to manufacture, and which will give accurate indications.

Another object of this invention is the provision of a device which is simple and has no parts relatively movable with each other, thus forming a structure which moves as a unit.

Another object of this invention is to provide a device which may be adjusted so that the indicating portion will always be accurate.

Further objects of this invention include improvements in detail of a construction and operation whereby a simple and effective device of this character is provided.

To the accomplishment of the foregoing, and such other objects as may hereinafter appear, this invention comprises the construction, combination and arrangement of parts hereinafter described and then sought to be defined in the appended claims, reference being had to the accompanying drawings forming a part hereof, and which show merely for the purpose of illustrative disclosure, a preferred embodiment of my invention, it being expressly understood, however, that various changes may be made in practice within the scope of the claims without digressing from my inventive idea.

In the drawings—

Fig. 1 represents a boiler with the indicator of the present invention attached thereto;

Fig. 2 is a vertical cross-section of a reservoir connected to the boiler and showing the indicator in an operative condition; and Fig. 3 is a view of the detached reservoir and indicator in rear elevation.

Referring now to the drawings, numeral 1 designates a boiler. The numeral 2 designates a cylinder which is connected to the boiler by nipples 3 and 4, which are provided with flanges 3' and 4' for connection with the boiler. The cylinder 2 is provided with heads 5 and 6 which are attached to flanges 7 and 8 of the cylinder by bolts 7' and 8'. The upper head 5 is provided with an aperture which provides a sliding contact and guide for a rod 12. The upper side of the head 5 is provided with a threaded nipple 13, which nipple is provided with an aperture larger than aperture 11 to allow the use of a packing to prevent the escape of steam. This packing may be of any material which is generally used for packing. An internally threaded cap 14 screws on to the nipple 13 and forces a sleeve 15 down so that a good joint may be provided at all times by merely loosening or tightening the cap 14. The structure just defined form a packing gland. The lower head 6 is provided with an aperture 16 with which a valve or pet cock 17 has threaded engagement. This valve allows the removal of sediment or water from the cylinder 2.

At its one end an arm 18 is fastened to the rod 12 by means of a set-screw, thus forming an adjustable connection between the rod 12 and the arm 18. At its other end it is fastened to a tubular rod 20 by means of a set-screw 21. This connection allows the rod 20 to be adjusted with respect to the rod 12. A guide member 22 is mounted on the head 5 and is provided with an aperture with which the rod 20 has sliding engagement. The guide member 22 is held in place by a bolt 7' which also serves to bolt the head 5 to the cylinder 2. The tubular rod 20 carries wires 24 and 25 which are adapted to conduct current for a lamp 26 carried by the lower end of the rod 20.

The lower end of the rod 12 carries a piston 27 which may have a soldered, welded, or pin connection with the rod 12. This piston may be made of iron, an iron alloy, or an alluminum alloy, or any other suitable material. The piston is provided with rings 28 which provide a sealing contact with the inner walls of the cylinder 2 and prevent the leakage of water or steam between the piston and the wall. Numeral 30 designates the usual blow-off whistle.

Numerals 31, 32 and 33 designate valves or pet cocks which may be used to ascertain the height of the liquid level in the cylinder 2.

Instead of the lamp 26 it is within the purview of the invention to provide a scale on a graduated member on the cylinder 2 and change the lamp to a pointer or other indicating means. However, the lamp is the simpler and preferred construction.

In operation the water in the cylinder 2 and the boiler 1 will rise to the same level. As the level changes the piston 27 will be raised if the level rises and will be lowered by its own weight if the level lowers.

It will be seen that I have provided a simple, cheap and effective indicator for use with boilers.

What I claim is—

1. In combination with a boiler, a liquid level indicator comprising a cylinder closed at both ends, the closed upper end being provided with an aperture, a piston in the cylinder, a rod attached to the piston and extending through the apertured upper end, an arm adjustably connected to the rod at a point outside of the cylinder, a second rod connected to the arm and provided with means for indicating the position of the piston.

2. A liquid level indicator adapted to be used with a boiler comprising a cylinder, apertured heads at each end thereof, a valve closing one aperture, a packing gland in the other aperture, a piston in said cylinder, a rigid rod connected to the piston and extending through the packing gland, an indicator, a rigid member connecting said indicator to the said rod whereby an indication is transmitted to the indicator by movements of the piston.

3. A liquid level indicator adapted to be used with a boiler comprising a cylinder, apertured heads at each end thereof, a valve closing one aperture, a packing gland in the other aperture, a piston in said cylinder, a rigid rod connected to the piston and extending through the packing gland, an indicator, a rigid member connecting said indicator to the said rod whereby an indication is transmitted to the indicator by movements of the piston, said indicator comprising a rigid rod with a lamp at its extremity.

4. A liquid level indicator adapted to be used with a boiler comprising a cylinder, apertured heads at each end thereof, a valve closing one aperture, a packing gland in the other aperture, a piston in said cylinder, a rigid rod connected to the piston and extending through the packing gland, an indicator, a rigid member connecting said indicator to the said rod whereby an indication is transmitted to the indicator by movements of the piston, and a guide means attached to the head for guiding said indicator.

5. A liquid level indicator adapted to be used with a boiler comprising a cylinder, apertured heads at each end thereof, a valve closing one aperture, a packing gland in the other aperture, a piston in said cylinder, a rigid rod connected to the piston and extending through the packing gland, an indicator, a rigid member connecting said indicator to the said rod whereby an indication is transmitted to the indicator by movements of the piston, said connection between said rigid rod and said indicator comprising means whereby the indicator may be adjustably connected with the rigid rod.

6. A liquid level indicator adapted to be connected with a boiler comprising an elongated receptacle, a piston means of substantially the same size and contour as the interior of the receptacle adapted to ride on and follow the liquid level in the receptacle, an indicating means and an adjustable means connecting the piston means with the said indicating means.

7. In combination with a boiler, a liquid level indicator comprising a cylinder closed at both ends, the closed upper end being provided with an aperture, piston means in the cylinder, a rod attached to the piston means and extending through the apertured upper end, an arm adjustably connected to the rod at a point outside of the cylinder, a second rod connected to the arm and provided with mean for indicating the position of the piston means.

8. In a liquid level indicator which moves as a unit, a rigid rod, a piston at one end thereof and an arm at the other end, and a tubular rigid rod connected to the other end of the arm and having a lamp at its end, said tubular rod being adapted to receive a plurality of electric wires.

9. In combination with a boiler, a liquid level indicator, comprising a cylinder closed at both ends, the closed upper end being provided with an aperture, a piston in the cylinder, a rod attached to the piston and extending through the apertured upper end, an arm adjustably connected to the rod at a point outside of the cylinder, and a tubular rod adjustably connected to the arm and provided with means for indicating the position of the piston.

10. A liquid level indicator which comprises a cylinder closed at both ends, a piston in the cylinder, a rod attached to said piston and extending through the end of the cylinder, an arm adjustably connected to the rod at a point outside the cylinder, a second rod adjustably connected to the said arm and provided with means for indicating the position of the piston.

11. In a liquid level indicator which moves as a unit, a rigid rod, a piston at one end thereof, an arm adjustably mounted on the other end, and a second rigid rod connected to the arm and provided with an indicator in substantially the same plane as the piston.

12. A liquid level indicator adapted to be connected with a boiler comprising an elongated receptacle and piston means of substantially the same size and contour as the interior of the receptacle adapted to ride on and follow the liquid level in the receptacle, an illuminated indicating means and an adjustable connection between said piston and said indicating means.

In testimony that I claim the foregoing, I have hereunto set my hand this 26th day of June, 1929.

JOHN J. CAIN.